United States Patent
Ding et al.

(10) Patent No.: US 11,461,556 B2
(45) Date of Patent: Oct. 4, 2022

(54) METHOD AND APPARATUS FOR PROCESSING QUESTIONS AND ANSWERS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Yuchen Ding, Beijing (CN); Kai Liu, Beijing (CN); Jing Liu, Beijing (CN); Yan Chen, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 280 days.

(21) Appl. No.: 16/886,244

(22) Filed: May 28, 2020

(65) Prior Publication Data
US 2021/0200956 A1    Jul. 1, 2021

(30) Foreign Application Priority Data
Dec. 27, 2019  (CN) .......................... 201911382826.8

(51) Int. Cl.
*G06F 40/30*    (2020.01)
*G06F 40/258*   (2020.01)
(Continued)

(52) U.S. Cl.
CPC ............ *G06F 40/30* (2020.01); *G06F 40/258* (2020.01); *G06N 3/088* (2013.01); *G09B 7/02* (2013.01)

(58) Field of Classification Search
CPC .... G06F 40/30; G06F 40/258; G06F 16/3329; G06F 16/3334; G06F 16/3344;
(Continued)

(56) References Cited

U.S. PATENT DOCUMENTS 10,019,513 B1    7/2018  Koren et al.
11,243,955 B2*   2/2022  Ackermann ...... G06F 16/24564
(Continued)

FOREIGN PATENT DOCUMENTS

CN    108345585 A    7/2018
CN    108984475 A    12/2018
(Continued)

OTHER PUBLICATIONS

Extended European Search Report for EP Application No. 20176461.0, dated Nov. 20, 2020, 13 pages.
(Continued)

*Primary Examiner* — Michael N Opsasnick
(74) *Attorney, Agent, or Firm* — Fay Sharpe LLP

(57) ABSTRACT

A method for processing questions and answers includes: in a process of determining an answer to a question to be answered, determining the semantic representation on the question to be answered respectively with a first semantic representation model of question and a second semantic representation model of question. Semantic representation vectors obtained through the first semantic representation model of question and the second semantic representation model of question are spliced. A spliced semantic vector is determined as a semantic representation vector of the question to be answered. An answer semantic vector matching the semantic representation vector of the question to be answered is acquired from a vector index library of answer, and an answer corresponding to the answer semantic vector is determined as a target answer to the question to be answered.

12 Claims, 6 Drawing Sheets

(51) Int. Cl.
    *G06N 3/08*    (2006.01)
    *G09B 7/02*    (2006.01)

(58) Field of Classification Search
    CPC .... G06F 16/3347; G06N 3/088; G06N 20/00; G06N 20/20; G09B 7/02
    See application file for complete search history.

(56) References Cited

U.S. PATENT DOCUMENTS

| | | | |
|---|---|---|---|
| 2014/0006012 | A1 | 1/2014 | Zhou et al. |
| 2014/0297266 | A1* | 10/2014 | Nielson .................. A61B 5/374 704/9 |
| 2015/0375104 | A1* | 12/2015 | Nishar .................... A63F 13/65 463/9 |
| 2017/0249311 | A1 | 8/2017 | Pelleg et al. |
| 2017/0308531 | A1* | 10/2017 | Ma ....................... G06F 16/3329 |
| 2018/0276525 | A1 | 9/2018 | Jiang et al. |
| 2018/0308473 | A1* | 10/2018 | Scholar .................. A63F 13/44 |
| 2020/0293586 | A1* | 9/2020 | Singhal ............... G06F 16/9538 |

FOREIGN PATENT DOCUMENTS

| | | |
|---|---|---|
| CN | 109002519 A | 12/2018 |
| CN | 109740077 A | 5/2019 |
| CN | 110309305 A | 10/2019 |
| CN | 110516059 A | 11/2019 |
| EP | 3229157 A1 | 10/2017 |
| WO | 20190106758 A1 | 6/2019 |

OTHER PUBLICATIONS

Office Action for Chinese Application 201911382826.8, dated Aug. 28, 2020, 17 pages.
Office Action for Japanese Application No. 2020-196082, dated Dec. 14, 2021, 8 pages.
Office Action for Korean Application No. 10-2020-0090951, dated Nov. 29, 2021, 13 pages.
Seon-Hoon et al., "Question Retrieval Using Deep Semantic Matching for Community Question Answering", Oct. 13, 2017, 12 pages.

* cited by examiner

METHOD AND APPARATUS FOR PROCESSING QUESTIONS AND ANSWERS, ELECTRONIC DEVICE AND STORAGE MEDIUM

CROSS REFERENCE TO RELATED APPLICATIONS

This application claims priority and benefits to Chinese Application No. 201911382826.8, filed on Dec. 27, 2019, the entire content of which is incorporated herein by reference.

FIELD

The present disclosure relates to a field of computer technologies, in particular, to a field of natural language processing technologies, and specifically, to a method and an apparatus for processing questions and answers, an electronic device and a storage medium.

BACKGROUND

Question and answer function is an advanced function that developers of various information retrieval systems seek to provide to users. As manually answering a question raised by the users may requires high labor costs, in order to save labor costs, how to intelligently and automatically provide an answer to the question raised by the users is a technical problem that needs to be urgently solved in the art.

SUMMARY

The present disclosure provides a method for processing questions and answers. The method includes: acquiring a question to be answered; inputting the question to be answered into a first semantic representation model of question and a second semantic representation model of question separately to obtain a first semantic representation vector and a second semantic representation vector for the question to be answered, in which the first semantic representation model of question is trained based on a question sample and an answer sample corresponding to the question sample, and the second semantic representation model of question is trained based on the question sample and an article title corresponding to the answer sample; performing a splicing operation based on the first semantic representation vector and the second semantic representation vector to obtain a target semantic representation vector for the question to be answered; matching the target semantic representation vector for the question to be answered with each semantic representation vector of answer included in a pre-established vector index library of answer, in which the vector index library of answer is established by converting all candidate answers in a sample pool of answers into respective semantic representation vectors, and the semantic representation vector of answer corresponding to the candidate answer is obtained based on the semantic representation vector for the candidate answer and a semantic representation vector of title for the article title corresponding to the candidate answer; and acquiring a target answer based on the semantic representation vector of answer matched, and outputting the target answer.

The present disclosure provides an electronic device. The electronic device includes at least one processor, and a storage device communicatively connected to the at least one processor. The storage device is configured to store an instruction executable by the at least one processor. The instruction is executed by the at least one processor to enable the at least one processor to perform the method for processing questions and answers described above.

The present disclosure provides a non-transitory computer-readable storage medium having a computer instruction stored thereon. The computer instruction is configured to cause a computer to perform the method for processing questions and answers described above.

The above embodiments of the present disclosure may have the following advantages or beneficial effects. In the process of question-answer matching, there is no need to calculate the confidence of each answer, thereby improving efficiency of obtaining the answer corresponding to the question. In addition, a correct answer matching the question is determined based on the relevance of the candidate answer and the relevance of the article title of the article including the candidate answer to the question, thereby improving the accuracy of question-answer matching. Since the semantic representation vector of answer for the candidate answer is pre-stored in the vector index library of answer, the calculation amount of the semantic vectorization representation of the answer in the online process is reduced. With the technical solution of determining the correct answer matching the question based on the relevance of the candidate answer and the relevance of the article title of the article including the candidate answer to the question, the technical problems of low efficiency and low accuracy of question-answer matching existing in the related art may be solved, thereby achieving the technical effect of increasing the efficiency of obtaining the corresponding answer to the question and improving the accuracy of question-answer matching.

Other effects of the above optional implementations will be described below in combination with specific embodiments.

BRIEF DESCRIPTION OF THE DRAWINGS

The accompanying drawings are used for a better understanding of this solution, and do not constitute a limitation on the present disclosure.

DETAILED DESCRIPTION

Figure 1:
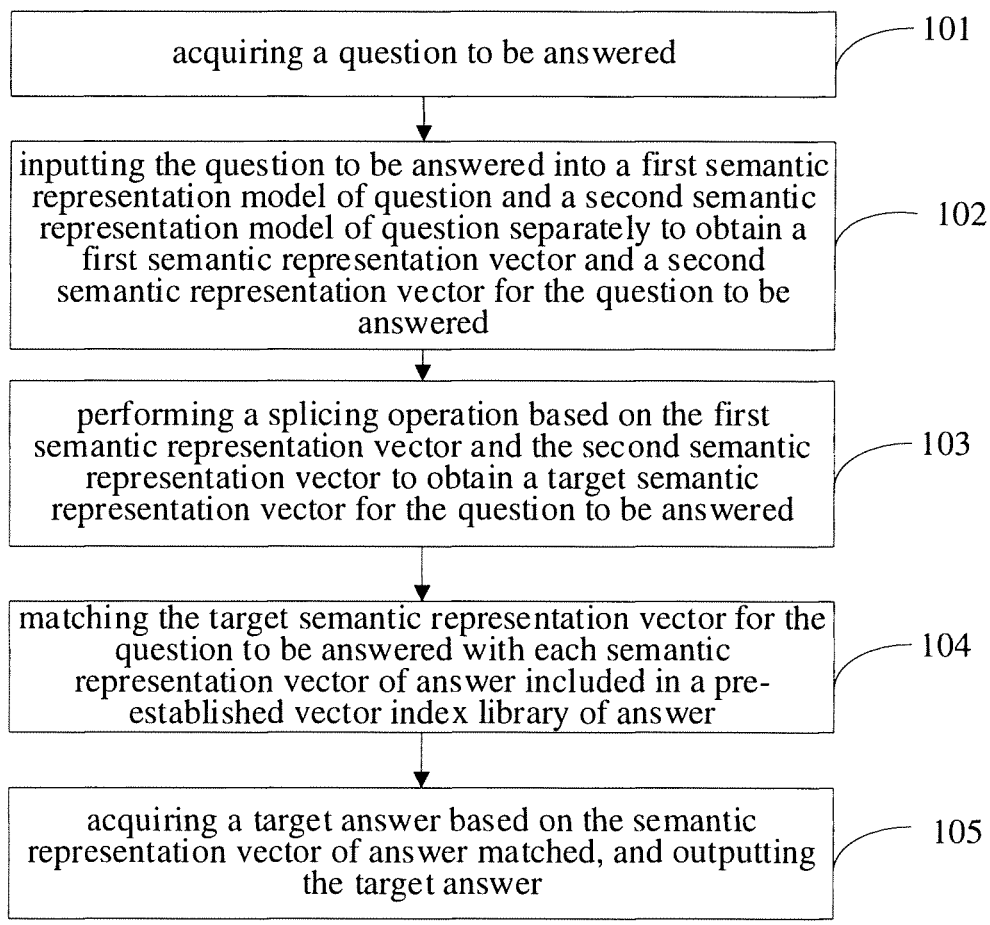
FIG. 1 is a schematic diagram illustrating a first embodiment of the present disclosure.

Exemplary embodiments of the present disclosure are described below with reference to the accompanying drawings, which include various details of embodiments of the present disclosure to facilitate understanding, and should be considered as merely exemplary. Therefore, those skilled in the art should recognize that various changes and modifications may be made to embodiments described herein without departing from the scope and spirit of the present disclosure. Also, for clarity and conciseness, descriptions of well-known functions and structures are omitted in the following description.

In the related art, there are generally two methods to automatically provide the answer to the question. A first method is to return the answer of the question to a user using a retrieval-based question system. In the first method, the answer of the question is generally provided as follows. For an inputted question, a certain amount of candidate texts may be found from massive texts through information retrieval (such as the search engine technology). Answer characteristics of all candidate texts may be calculated through various methods such as semantic matching and feature extraction. A confidence that the text is a correct answer is calculated, and the text with the highest confidence is determined as the answer. A second method is to return the answer of the question to the user using a question-answer-database-based question system. In the second method, the answer of the question is generally provided to the user as follows. For a question q proposed by the user, all groups of <question-answer> in the database are traversed, a matching confidence between the question q and each question is calculated, and a matching confidence between the question q and each answer is calculate, to choose the answer corresponding to the matching confidence higher than a predetermined threshold as the answer of the question.

However, the inventor found that when optimizing the retrieval-based question system, it is necessary to optimize models of the two steps in the question and answer system, which not only produces a large workload, but also has an effect loss caused by inconsistent goals of models of different steps. In addition, optimizing the question-answer-database-based question system depending on a selected technical solution, has a problem of low answer coverage, or low accuracy of the answer and poor performance, and takes a long time to obtain the answer of the question. Therefore, how to provide an answer of a problem accurately and quickly is a technical problem that needs to be solved.

The present disclosure provides a method and an apparatus for processing questions and answers, an electronic device and a storage medium. In a process of matching the questions and the answers, there is no need to calculate a confidence of each answer, thereby improving efficiency of obtaining the answer of the question. In addition, a semantic representation vector corresponding to each candidate answer in the present disclosure is determined from the semantic representation vector of the candidate answer in combination with a semantic vector of an article title of an article including the candidate answer. Consequently, a correct answer matching the question may be determined based on a relevance of the candidate answer and a relevance of the article title of the article including the candidate answer to the question, thereby improving the accuracy of question-answer matching.

A method and an apparatus for processing questions and answers, an electronic device and a storage medium will be described below with reference to the accompanying drawings.

FIG. 1 is a schematic diagram illustrating a first embodiment of the present disclosure. It should be noted that an execution body of the method for processing questions and answers according to embodiments may be an apparatus for processing questions and answers. The apparatus may be implemented by software and/or hardware. The apparatus may be integrated in an electronic device. The electronic device may include, but is not limited to a terminal device, a server, etc., which is not limited in the present disclosure.

Description is made by taking the apparatus for processing questions and answers being integrated into a question-answer system and the question-answer system being integrated into a server as an example.

As illustrated in FIG. 1, the method for processing questions and answers may include the following.

At block 101, a question to be answered is acquired.

In detail, a question currently input by a user into the question-answer system may be determined as the question to be answered.

In embodiments, in order to personalize the question for the user, the question-answer system according to embodiments may provide an input interface for the user to input the question as needed.

Text, and/or voice and/or picture may be inputted through the input interface.

It may be understood that when the user inputs the question in voice, the voice information inputted by the user may be acquired, and may be processed with speech recognition. Text information obtained after the speech recognition may be determined as the question to be answered. When the user inputs a question in a format of picture, the picture may be processed with text recognition. A result obtained after the text recognition may be used as the question to be answered.

At block 102, the question to be answered is inputted into a first semantic representation model of question and a second semantic representation model of question separately to obtain a first semantic representation vector and a second semantic representation vector for the question to be answered.

The first semantic representation model of question may be trained based on a question sample and an answer sample corresponding to the question sample. The second semantic representation model of question may be trained based on the question sample and an article title corresponding to the answer sample.

It should be noted that, after the training, the first semantic representation model of question may be configured to output the semantic representation vector of the question sample. A vector similarity between the semantic representation vector of the question sample and the semantic representation vector of a correct answer sample may exceed a preset similarity threshold.

It should be noted that, after the training, the second semantic representation model of question is configured to output the semantic representation vector of the question sample. A vector similarity between the semantic representation vector of the question sample and the semantic representation vector of title for the article title corresponding to the correct answer sample may exceed the preset similarity threshold.

The semantic representation vector of title for the article title corresponding to the correct answer sample may be obtained through a preset semantic representation model of title, or may be obtained through some other existing manners, which is not limited in embodiments. In the present disclosure, the semantic representation vectorization is performed on a corresponding article title through the semantic representation model of title, to obtain the semantic representation vector of title for the corresponding article title.

It should be noted that, the process of training both of the second semantic representation model of question and the semantic representation model of title based on the question sample in combination with the article title corresponding to the answer sample will be described subsequently in the present disclosure, which is not repeated here.

At block 103, a splicing operation is performed based on the first semantic representation vector and the second semantic representation vector to obtain a target semantic representation vector for the question to be answered.

In the present disclosure, the first semantic representation vector and the second semantic representation vector may provide different functions in the process of question-answer matching in the question-answer system. In order to accurately obtain the target answer corresponding to the question to be answered subsequently, the first semantic representation vector and the second semantic representation vector may be spliced as follows to obtain the target semantic representation vector for the question to be answered. The first semantic representation vector is multiplied by a first weight to obtain a first intermediate semantic representation vector for the question to be answered. The second semantic representation vector is multiplied by a second weight to obtain a second intermediate semantic representation vector for the question to be answered. The first intermediate semantic representation vector and the second intermediate semantic representation vector are spliced to obtain the target semantic representation vector for the question to be answered.

As an example, the question to be answered is denoted as q, the first semantic representation vector determined by the first semantic representation model for the question "q" is denoted as q_rep, and the second semantic representation vector determined by the second semantic representation model for the question "q" is denoted as qt_rep. When the first weight is a and the second weight is b, after the first semantic representation vector and the second semantic representation vector are spliced based on weights, the target semantic representation vector for the question to be answered may be Q_REP=[a*q_rep, b*qt_rep].

The first weight may be determined by analyzing the function provided by the answer samples in the question-answer matching. That is, the first weight is determined by analyzing the functions provided by the question samples and by the answer samples in determining the correct answer for the question.

The second weight may be determined by analyzing the function provided by the article title in the question-answer matching. That is, the second weight is determined by analyzing the function provided by the article title in determining the correct answer for the question.

At block 104, the target semantic representation vector for the question to be answered is matched with each semantic representation vector of answer included in a pre-established vector index library of answer.

The vector index library of answer may be established by converting all candidate answers in a sample pool of answers into respective semantic representation vectors. The semantic representation vector of answer corresponding to the candidate answer may be obtained based on the semantic representation vector of the candidate answer and the semantic representation vector of title for the article title corresponding to the candidate answer.

In order to quickly determine the semantic representation vector of the candidate answer and the semantic representation vector of title for the corresponding article title, in the present disclosure, the semantic representation vector of the candidate answer may be obtained by performing the semantic representation vectorization on the candidate answer through the semantic representation model of answer, and the semantic representation vector of title may be obtained by performing the semantic representation vectorization on the article title corresponding to the candidate answer through the semantic representation model of title.

The semantic representation model of answer may be trained based on the question sample and the answer sample corresponding to the question sample.

The semantic representation model of title may be trained based on the question sample and the article title corresponding to the answer sample.

It should be noted that, the process of training the semantic representation model of answer and the semantic representation model of title based on the question sample in combination with the answer sample corresponding to the question sample will be described sequentially, which is not repeated here.

In the present disclosure, it may be understood that the semantic representation vector of the candidate answer and the semantic representation vector of title corresponding to the article title may provide different functions in determining the correct answer corresponding to the question. The semantic representation vector of answer corresponding to the candidate answer may be determined based on the semantic representation vector of the candidate answer and the semantic representation vector of title for the article title corresponding to the candidate answer as follows. The semantic representation vector of the candidate answer is multiplied by a preset first weight to obtain a new semantic representation vector. The semantic representation vector of title is multiplied by a preset second weight to obtain a new semantic representation vector of title. The new semantic representation vector and the new semantic representation vector of title are spliced to obtain a spliced semantic representation vector. The spliced semantic representation vector is determined as the semantic representation vector of answer corresponding to the candidate answer.

It should be noted that, the weights used in the splicing process may be the same as the weights used in the above splicing process of the semantic representation vector for the question to be answered. For the first weight and the second weight, reference may be made to the foregoing part, and no further description will be given here.

At block 105, a target answer is acquired based on the semantic representation vector of answer obtained after the matching, and the target answer is outputted.

In detail, the target semantic representation vector for the question to be answered may be matched with each semantic representation vector of answer included in the pre-established vector index library of answer to acquire the semantic representation vector of answer closest to the target semantic representation vector. The answer corresponding to the semantic representation vector of answer closest to the target semantic representation vector may be determined as the correct answer of the question to be answered, and the correct answer of the question to be answered is outputted.

Figure 2:
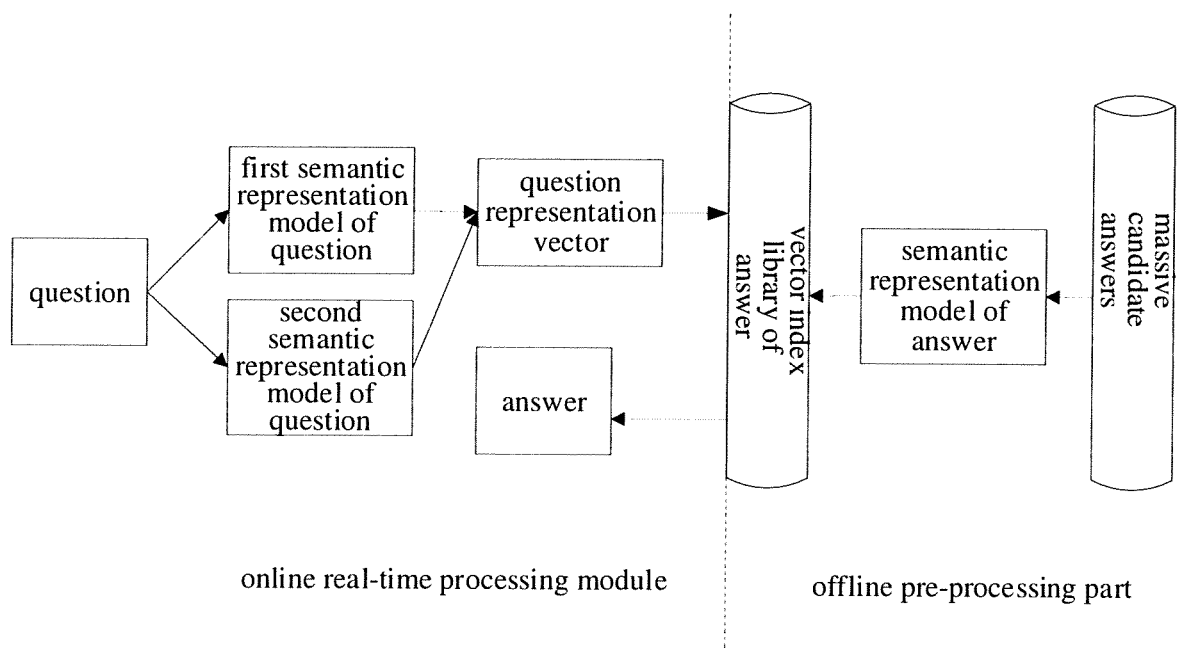
FIG. 2 is a schematic diagram illustrating question-answer matching.

The method for processing questions and answers according to embodiments will be further described below with reference to FIG. 2. It should be noted that FIG. 2 is described by performing the semantic representation vectorization on a candidate answer text through the semantic representation model of answer.

It may be understood that, performing "semantic computing on an answer" online is commonly a most time-consuming part of the question-answer semantic matching. In order to quickly output the correct answer corresponding to the question and improve the efficiency of answering the question online, the "semantic computing on an answer" may be pre-performed offline.

The overall technical concept of the present disclosure is to convert all candidate answers (candidate answer texts) into respective semantic representation vectors in advance through the semantic representation model of answer, and save the semantic representation vectors into the vector index library of answer. Correspondingly, for a question input by the user, the question may be converted into a vector firstly, and then the semantic representation vector of answer that best matches the question vector may be searched for from a vector retrieval system. The answer corresponding to the best matched semantic representation vector of answer may be determined as the answer of the question, and the answer of the question is outputted.

The vector index library of answer in the present disclosure may be integrated in the vector retrieval system.

In conclusion, it may be seen that in the present disclosure, by converting all candidate answers into semantic representation vectors in advance and storing the semantic representation vectors into the vector index library of answer, after the question to be answered is acquired, the answer of the question to be answered may be obtained quickly by converting the question into the semantic representation vector, acquiring the semantic representation vector of answer matching the question semantic representation vector from the vector index library of answer, and acquiring the answer corresponding to the matched semantic representation vector of answer, thereby saving a process of calculating the confidence of each answer and improving the efficiency of obtaining the answer corresponding to the question. In addition, the semantic representation vector corresponding to the candidate answer in the present disclosure is determined from the semantic representation vector of the candidate answer and the semantic representation vector of title for the article including the candidate answer. Consequently, a correct answer matching the question may be determined based on a relevance of the candidate answer and a relevance of the article title of the article including the candidate answer to the question, thereby improving the accuracy of question-answer matching.

With the method for processing questions and answers according to embodiments of the present disclosure, in a process of determining the answer for the question to be answered, the semantic representations of the question to be answered are determined respectively based on the first semantic representation model of question and the second semantic representation model of question. Resultant semantic representation vectors are spliced. The spliced semantic vector is determined as the semantic representation vector for the question to be answered. The semantic representation vector of answer matching the semantic representation vector for the question to be answered is acquired from the vector index library of answer. A target answer corresponding to the semantic representation vector of answer matching the semantic representation vector for the question to be answered is determined and outputted as the target answer for the question to be answered. Consequently, in the process of question-answer matching, there is no need to calculate the confidence of each answer, thereby improving efficiency of obtaining the answer corresponding to the question. In addition, the semantic representation vector corresponding to each candidate answer in embodiments is determined from the semantic representation vector of the candidate answer in combination with the semantic vector of an article title of an article including the candidate answer. Consequently, a correct answer matching the question may be determined based on a relevance of the candidate answer and a relevance of the article title of the article including the candidate answer to the question, thereby improving the accuracy of question-answer matching.

The process of training the first semantic representation model of question and the semantic representation model of answer will be described with reference to FIG. 3 below. It should be noted that the answer sample include an incorrect answer sample and a correct answer sample. The incorrect answer sample refer to an incorrect answer having a certain relevance with the question sample.

Figure 3:
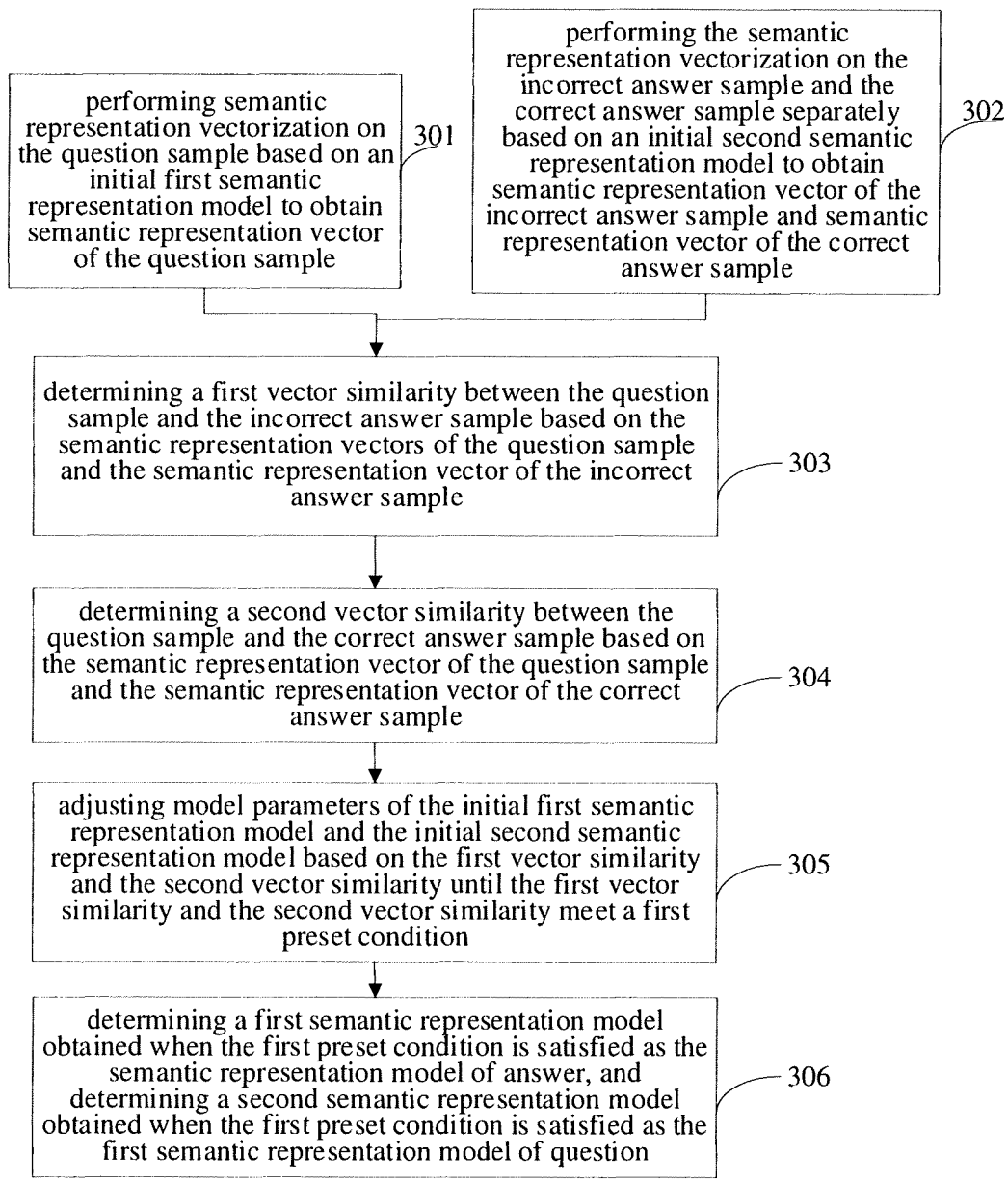
FIG. 3 is a schematic diagram illustrating a second embodiment of the present disclosure.

As illustrated in FIG. 3, the method may include the following.

At block 301, the semantic representation vectorization is performed on the question sample based on an initial first semantic representation model to obtain a semantic representation vector of the question sample.

At block 302, the semantic vectorization representation is performed on the incorrect answer sample and on the correct answer sample separately based on an initial second semantic representation model to obtain the semantic representation vector of the incorrect answer sample and the semantic representation vector of the correct answer sample.

At block 303, a first vector similarity between the question sample and the incorrect answer sample is determined based on the semantic representation vector of the question sample and the semantic representation vector of the incorrect answer sample.

In detail, after the semantic representation vector of the question sample and the semantic representation vector of the incorrect answer sample are obtained, a cosine similarity between the semantic representation vector of the question sample and the semantic representation vector of the incorrect answer sample may be calculated. The cosine similarity may be determined as the vector similarity between the question sample and the incorrect answer sample.

At block 304, a second vector similarity between the question sample and the correct answer sample is determined based on the semantic representation vector of the question sample and the semantic representation vector of the correct answer sample.

In detail, after the semantic representation vector of the question sample and the semantic representation vector of the correct answer sample are obtained, the cosine similarity between the semantic representation vector of the question sample and the semantic representation vector of the correct answer sample may be calculated. The cosine similarity may be determined as the vector similarity between the question sample and the correct answer sample.

At block 305, model parameters of the initial first semantic representation model and model parameters of the initial second semantic representation model are adjusted based on the first vector similarity and the second vector similarity until the first vector similarity and the second vector similarity meet a first preset condition.

It may be understood that after the model parameters of the initial first semantic representation model and the model parameters of the initial second semantic representation model are adjusted, the semantic representation vectorization may be performed again on respective inputs of the first semantic representation model and the second semantic representation model using the adjusted first semantic representation model and the adjusted second semantic representation model. The adjustment of the model parameters of the first semantic representation model and the second semantic representation model is not stopped until the calculated first vector similarity and second vector similarity satisfy the first preset condition. That is, training the models is finished.

The first present condition may be configured in advance such that when the first vector similarity and the second vector similarity meet the first preset condition, training the models is finished. For example, the first preset condition may be that a difference value obtained by subtracting the vector similarity between the question sample and the incorrect answer sample from the vector similarity between the question sample and the correct answer sample reaches a maximum difference value.

At block 306, the first semantic representation model obtained when the first preset condition is satisfied is determined as the semantic representation model of answer, and the second semantic representation model obtained when the first preset condition is satisfied is determined as the first semantic representation model of question.

In the present disclosure, both the initial first semantic representation model and the initial second semantic representation model are trained using the question sample, together with the correct answer sample and the incorrect answer sample. When the vector similarity between the question sample and the correct answer sample and the vector similarity between the question sample and the incorrect answer sample satisfy the first preset condition, training the model is stopped. The first semantic representation model obtained when the training is stopped is determined as the semantic representation model of question, and the second semantic representation model obtained when the training is stopped is determined as the semantic representation model of answer. Consequently, it may allow that the semantic vector of the question is similar to the semantic vector of the correct answer as much as possible, so as to ensure the accuracy of question-answer matching.

In an embodiment of the present disclosure, obtaining the first semantic representation model of question and the semantic representation model of answer through the training using the question sample together with the correct answer sample and the incorrect answer sample may include the following.

At an initial moment, a pre-trained language model that is trained with a large-scale corpus is used as an initial semantic representation model. The initial first semantic representation model is used to obtain the semantic representation vector "Q_rep" of the question sample "query", and the initial second semantic representation model is used to obtain the semantic representation vector "P_rep" of the answer sample "para". The inner product of these two vectors may be used as the matching confidence of the pair <query, para>.

Next, the model is trained. Each time, n pieces of data are input into the model according to a fixed format: <–query, para+, para–>, where para+ represents the correct answer sample of the question sample "query", and para– represents the incorrect answer sample that have certain relevance to the question sample "query". For each query of the input model, the relevance between the query and 2n pieces of paras (including positive and negative answers of each query) need to be calculated. A learning goal of the model is to make the relevance of the correct para to be a maximum one among the 2n pieces of relevance. When the model converges, the semantic representation model may be obtained for the query and para respectively.

The process of training the first semantic representation model of question and the semantic representation model of answer will be described in FIG. 4 below. It should be noted that, the question sample and the answer sample corresponding to the question sample are used.

Figure 4:
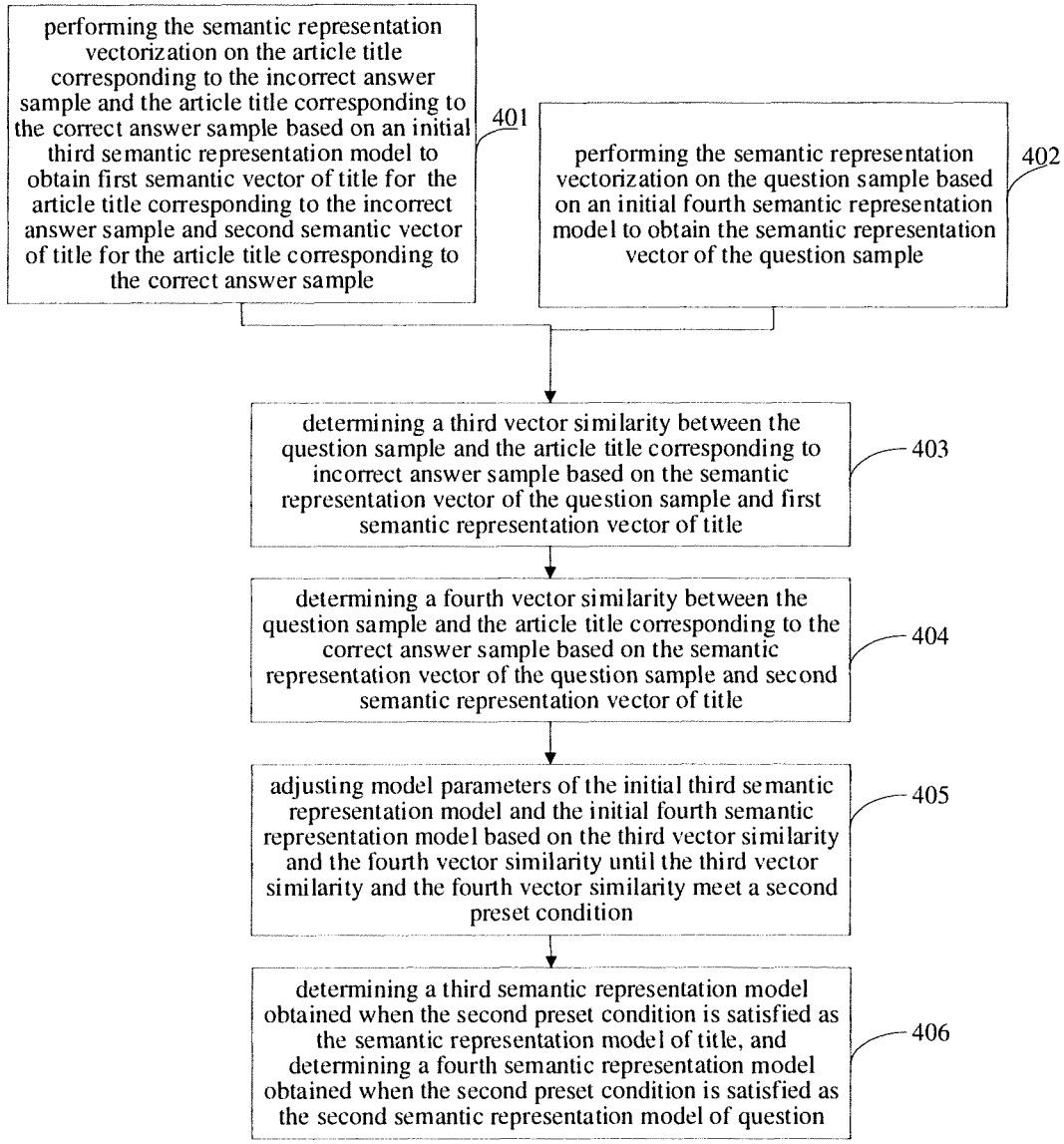
FIG. 4 is a schematic diagram illustrating a third embodiment of the present disclosure.

As illustrated in FIG. 4, the method may include the following.

At block 401, the semantic representation vectorization is performed on the article title corresponding to the incorrect answer sample and the article title corresponding to the correct answer sample based on an initial third semantic representation model to obtain first semantic vector of title for the article title corresponding to the incorrect answer sample and second semantic vector of title for the article title corresponding to the correct answer sample.

At block 402, the semantic representation vectorization is performed on the question sample based on an initial fourth semantic representation model to obtain the semantic representation vector of the question sample.

At block 403, a third vector similarity between the question sample and the article title corresponding to the incorrect answer sample is determined based on the semantic representation vector of the question sample and first semantic representation vector of title.

In detail, after the semantic representation vector of the question sample and the first semantic representation vector of title are obtained, the cosine similarity between the semantic representation vector of the question sample and the first semantic representation vector of title may be calculated. The cosine similarity may be determined as the vector similarity between the question sample and the article title corresponding to the incorrect answer sample.

At block 404, a fourth vector similarity between the question sample and the article title corresponding to correct answer sample is determined based on the semantic representation vector of the question sample and second semantic representation vector of title.

In detail, after the semantic representation vector of the question sample and the second semantic representation vector of title are obtained, the cosine similarity between the semantic representation vector of the question sample and the second semantic representation vector of title may be calculated. The cosine similarity may be determined as the vector similarity between the question sample and the article title corresponding to the correct answer sample.

At block 405, model parameters of the initial third semantic representation model and model parameters of the initial fourth semantic representation model are adjusted based on the third vector similarity and the fourth vector similarity until the third vector similarity and the fourth vector similarity meet a second preset condition.

At block 406, the third semantic representation model obtained when the second preset condition is satisfied is determined as the semantic representation model of title, and the fourth semantic representation model obtained when the second preset condition is satisfied is determined as the second semantic representation model of question.

Based on the above, the initial first semantic representation model, the initial second semantic representation model, the initial third semantic representation model, and the initial fourth semantic representation model may be the same model or different models.

In the present disclosure, in order to ensure that the initial first semantic representation model, the initial second semantic representation model, the initial third semantic representation model, and the initial fourth semantic representation model have learned semantic knowledge, to facilitate training the models subsequently based on a small amount of annotation data <question, answer>, and to save the work of training a candidate retrieval model and a feature extraction model in the retrieval-based question-answer system, all of the first semantic representation model, the second semantic representation model, the third semantic representation model and the fourth semantic representation model may be pre-trained semantic representation models.

The pre-trained semantic representation model is trained in advance using unsupervised data.

The pre-trained semantic representation model may include, but is not limited to, a knowledge-enhanced semantic representation model, such as an ERNIE (enhanced representation from knowledge integration) model and a BERT (bidirectional encoder representations from transformers) model.

In the present disclosure, the first semantic representation model, the second semantic representation model, the third semantic representation model, and the fourth semantic representation model may be the pre-trained semantic representation models, such that the models may be trained with only a certain amount of annotation data <question, answer>, thereby saving the work of training the candidate retrieval model and the feature extraction model in the retrieval-based question-answer system, shortening the time for obtaining the trained semantic representation models, and facilitating updates and optimization of the models in the question-answer system.

Based on the above, after the target answer corresponding to the question to be answered is output, feedback is received. The feedback is used to indicate that the target answer is not the correct answer to the question to be answered. In this case, the target answer may be added to the training data as the incorrect question sample of the question to be answered to obtain updated training data. Correspondingly, the semantic representation models used in the present disclosure are trained based on the updated training data to update these semantic representation models, thereby making the models more and more effective. In other words, iterations and updates of the models may be automatically performed, which may further improve the accuracy of question-answer matching.

In order to implement the above embodiments, embodiments of the present disclosure provide an apparatus for processing questions and answers.

Figure 5:
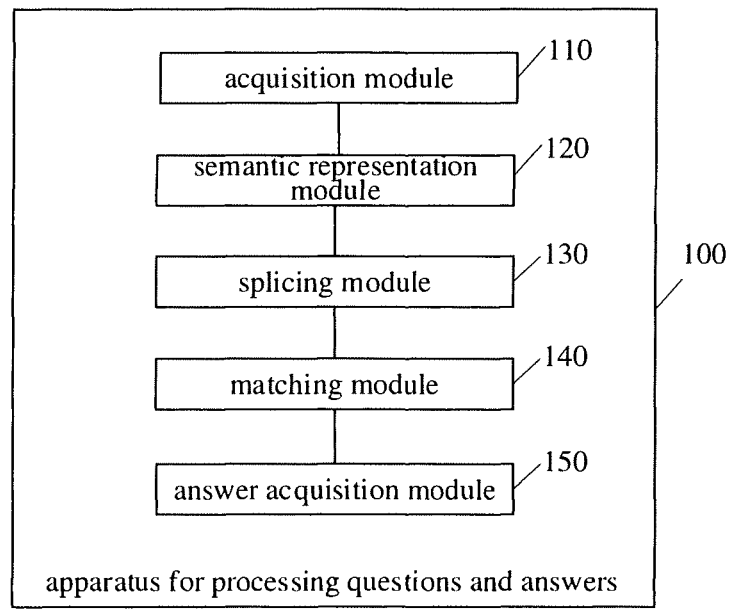
FIG. 5 is a schematic diagram illustrating a fourth embodiment of the present disclosure.

FIG. 5 is a schematic diagram illustrating a fourth embodiment of the present disclosure. As illustrated in FIG. 5, the apparatus 100 for processing questions and answers may include an acquisition module 110, a semantic representation module 120, a splicing module 130, a matching module 140, and an answer acquisition module 150.

The acquisition module 110 is configured to acquire a question to be answered.

The semantic representation module 120 is configured to input the question to be answered into a first semantic representation model of question and a second semantic representation model of question separately to obtain a first semantic representation vector and a second semantic representation vector for the question to be answered. The first semantic representation model of question is trained based on a question sample and an answer sample corresponding to the question sample. The second semantic representation model of question is trained based on the question sample and an article title corresponding to the answer sample.

The splicing module 130 is configured to perform a splicing operation on the first semantic representation vector and the second semantic representation vector to obtain a target semantic representation vector for the question to be answered.

The matching module 140 is configured to match the target semantic representation vector for the question to be answered with each semantic representation vector of answer in a pre-established vector index library of answer. The vector index library of answer is established by converting all candidate answers in a sample pool of answers into respective semantic representation vectors. The semantic representation vector of answer corresponding to the candidate answer is obtained based on the semantic representation vector of the candidate answer and a semantic representation vector of title for the article title corresponding to the candidate answer.

The answer acquisition module 150 is configured to acquire a target answer based on the semantic representation vector of answer matched with the target semantic representation vector, and to output the target answer.

In the present disclosure, the semantic representation vector of the candidate answer is obtained by performing a semantic representation vectorization on the candidate answer through a semantic representation model of answer. The semantic representation vector of title is obtained by performing the semantic representation vectorization on the article title corresponding to the candidate answer through a semantic representation model of title. The semantic representation model of answer is trained based on the question sample and the answer sample corresponding to the question sample. The semantic representation model of title is trained based on the question sample and the article title corresponding to the answer sample.

Figure 6:
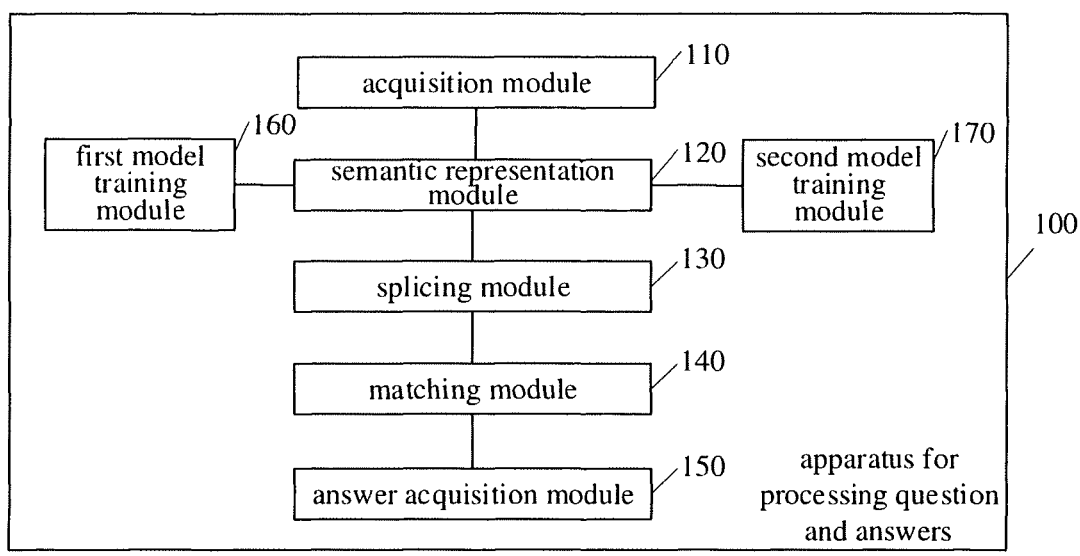
FIG. 6 is a schematic diagram illustrating a fifth embodiment of the present disclosure.

In the present disclosure, in order to determine an accurate semantic representation vectorization of the question and the candidate answer, the answer sample may include an incorrect answer sample and a correct answer sample. On the basis of the apparatus embodiment illustrated in FIG. 5, as illustrated in FIG. 6, the apparatus also includes a first model training module 160.

The first model training module 160 is configured to train the first semantic representation model of question and the semantic representation model of answer based on the question sample, the incorrect answer sample and the correct answer sample.

The first model training module 160 is further configured to: perform the semantic representation vectorization on the question sample based on an initial first semantic representation model to obtain semantic representation vector of the question sample; perform the semantic representation vectorization on the incorrect answer sample and the correct answer sample separately based on an initial second semantic representation model to obtain a semantic representation vector of the incorrect answer sample and a semantic representation vector of the correct answer sample; determine a first vector similarity between the question sample and the incorrect answer sample based on the semantic representation vector of the question sample and the semantic representation vector of the incorrect answer sample; determine a second vector similarity between the question sample and the correct answer sample based on the semantic representation vector of the question sample and the semantic representation vector of the correct answer sample; adjust model parameters of the initial first semantic representation model and model parameters of the initial second semantic representation model based on the first vector similarity and the second vector similarity until the first vector similarity and the second vector similarity meet a first preset condition; and determine a first semantic representation model obtained when the first preset condition is satisfied as the semantic representation model of answer, and determine a second semantic representation model obtained when the first preset condition is satisfied as the first semantic representation model of question.

In an embodiment of the present disclosure, in order to determine an accurate semantic representation vectorization of the question and the candidate answer, the answer sample includes the incorrect answer sample and the correct answer sample. On the basis of the apparatus embodiment illustrated in FIG. 5, as illustrated in FIG. 6, the apparatus also includes a second model training module 170.

The second model training module 170 is configured to obtain the semantic representation model of title and the second semantic representation model of question based on the question sample, the incorrect answer sample and the correct answer sample.

The second model training module 170 is configured to: perform the semantic representation vectorization on the article title corresponding to the incorrect answer sample and the article title corresponding to the correct answer sample based on an initial third semantic representation model to obtain a first semantic vector of title for the article title corresponding to the incorrect answer sample and a second semantic vector of title for the article title corresponding to the correct answer sample; perform the semantic representation vectorization on the question sample based on an initial fourth semantic representation model to obtain the semantic representation vector of the question sample; determine a third vector similarity between the question sample and the article title corresponding to the incorrect answer sample based on the semantic representation vector of the question sample and first semantic representation vectors of title; determine a fourth vector similarity between the question sample and the article title corresponding to the correct answer sample based on the semantic representation vector of the question sample and second semantic representation vectors of title; adjust model parameters of the initial third semantic representation model and model parameters of the initial fourth semantic representation model based on the third vector similarity and the fourth vector similarity until the third vector similarity and the fourth vector similarity meet a second preset condition; and determine a third semantic representation model obtained when the second preset condition is satisfied as the semantic representation model of title, and determine a fourth semantic representation model obtained when the second preset condition is satisfied as the second semantic representation model of question.

In the present disclosure, the first semantic representation model, the second semantic representation model, the third semantic representation model and the fourth semantic representation model are pre-trained semantic representation models. The pre-trained semantic representation models are trained using unsupervised data.

In the present disclosure, obtaining the semantic representation vector of answer corresponding to the candidate answer based on the semantic representation vector of the candidate answer and the semantic representation vector of title for the article title corresponding to the candidate answer may include: multiplying the semantic representation vector of the candidate answer by a preset first weight to obtain a new semantic representation vector; multiplying the semantic representation vector of title by a preset second weight to obtain a new semantic representation vector of title; and splicing the new semantic representation vector and the new semantic representation vector of title to obtain a spliced semantic representation vector, and determining the spliced semantic representation vector obtained as the semantic representation vector of answer corresponding to the candidate answer.

The splicing module 130 is further configured to: multiply the first semantic representation vector by the first weight to obtain a first intermediate semantic representation vector for the question to be answered; multiply the second semantic representation vector by the second weight to obtain a second intermediate semantic representation vector for the question to be answered; and splice the first intermediate semantic representation vector and the second intermediate semantic representation vector to obtain the target semantic representation vector for the question to be answered.

It should be noted that the foregoing explanations of the method for processing questions and answers are also applicable to the apparatus for processing questions and answers according to this embodiment, and thus details will not be described here.

With the question answering apparatus according to embodiments of the present disclosure, in the process of determining the answer to the question to be answered, the semantic representations of the question to be answered are obtained respectively based on the first semantic representation model of question and the second semantic representation model of question. Resultant semantic representation vectors are spliced. The spliced semantic vector is determined as the semantic representation vector for the question to be answered. The semantic representation vector of answer matching the semantic representation vector for the question to be answered is acquired from the vector index library of answer. A target answer corresponding to the matched semantic representation vector of answer is determined and outputted as the target answer for the question to be answered. Consequently, in the process of question-answer matching, there is no need to calculate the confidence of each answer, thereby improving efficiency of obtaining the answer corresponding to the question. In addition, the semantic representation vector corresponding to each candidate answer in embodiments is determined from the semantic representation vector of the candidate answer in combination with the semantic vector of an article title of an article including the candidate answer. Consequently, a correct answer matching the question may be determined based on a relevance of the candidate answer and a relevance of the article title of the article including the candidate answer to the question, thereby improving the accuracy of question-answer matching.

According to embodiments of the present disclosure, the present disclosure also provides an electronic device and a readable storage medium.

Figure 7:
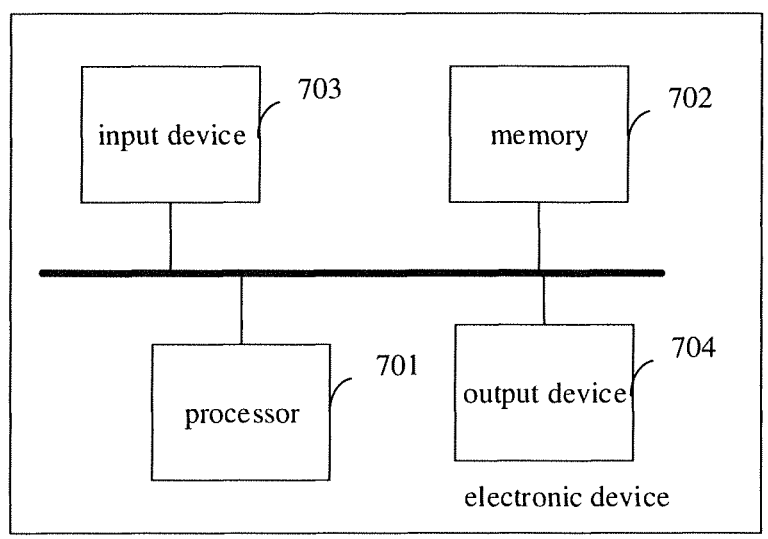
FIG. 7 is a block diagram illustrating an electronic device for implementing embodiments of the present disclosure.

FIG. 7 is a block diagram illustrating an electronic device for implementing embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 7, the electronic device includes: one or more processors 701, a memory 702, and interfaces for connecting various components, including a high-speed interface and a low-speed interface. The components are interconnected by different buses and may be mounted on a common motherboard or otherwise installed as required.

The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 701 is taken as an example in FIG. 7.

The memory 702 is a non-transitory computer-readable storage medium according to embodiments of the present disclosure. The memory stores instructions executable by at least one processor, so that the at least one processor executes the question answering processing method according to embodiments of the present disclosure. The non-transitory computer-readable storage medium according to the present disclosure stores computer instructions, which are configured to make the computer execute the method for processing questions and answers according to embodiments of the present disclosure.

As a non-transitory computer-readable storage medium, the memory 702 may be configured to store non-transitory software programs, non-transitory computer executable programs and modules, such as program instructions/modules corresponding to the question answering processing method according to the embodiment of the present disclosure. The processor 701 executes various functional applications and performs data processing of the server by running non-transitory software programs, instructions and modules stored in the memory 702, that is, the method for processing questions and answers according to the foregoing method embodiments is implemented.

The memory 702 may include a storage program area and a storage data area, where the storage program area may store an operating system and applications required for at least one function; and the storage data area may store data created according to the use of the electronic device, and the like. In addition, the memory 702 may include a high-speed random-access memory, and may further include a non-transitory memory, such as at least one magnetic disk memory, a flash memory device, or other non-transitory solid-state memories. In some embodiments, the memory 702 may optionally include memories remotely disposed with respect to the processor 701, and these remote memories may be connected to the electronic device through a network. Examples of the network include, but are not limited to, the Internet, an intranet, a local area network, a mobile communication network, and combinations thereof.

The electronic device may further include an input device 703 and an output device 704. The processor 701, the memory 702, the input device 703 and the output device 704 may be connected through a bus or in other manners. FIG. 7 is illustrated by establishing the connection through a bus.

The input device 703 may receive input numeric or character information, and generate key signal inputs related to user settings and function control of the electronic device, such as a touch screen, a keypad, a mouse, a trackpad, a touchpad, a pointing stick, one or more mouse buttons, trackballs, joysticks and other input devices. The output device 704 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing questions and answers, comprising:
   acquiring a question to be answered;
   inputting the question to be answered into a first semantic representation model of question and a second semantic representation model of question separately to obtain a first semantic representation vector and a second semantic representation vector for the question to be answered, wherein the first semantic representation model of question is trained based on a question sample and an answer sample corresponding to the question sample, and the second semantic representation model of question is trained based on the question sample and an article title corresponding to the answer sample;
   performing a splicing operation based on the first semantic representation vector and the second semantic representation vector to obtain a target semantic representation vector for the question to be answered;
   matching the target semantic representation vector for the question to be answered with each semantic representation vector of answer contained in a pre-established vector index library of answer, wherein the vector index library of answer is established by converting all candidate answers in a sample pool of answer into respective semantic representation vectors, and the semantic representation vector of answer corresponding to each candidate answer is obtained based on the semantic representation vector of the candidate answer and a semantic representation vector of title for the article title corresponding to the candidate answer; and
   acquiring a target answer based on the semantic representation vector of answer matched with the target semantic representation vector, and outputting the target answer;
   wherein the semantic representation vector of the candidate answer is obtained by performing a semantic representation vectorization on the candidate answer through a semantic representation model of answer, the semantic representation vector of title is obtained by performing the semantic representation vectorization on the article title corresponding to the candidate answer through a semantic representation model of title, the answer sample comprises an incorrect answer sample and a correct answer sample,
   wherein the first semantic representation model of question and the semantic representation model of answer are trained by:
   performing the semantic representation vectorization on the question sample based on an initial first semantic representation model to obtain a semantic representation vector of the question sample;
   performing the semantic representation vectorization on the incorrect answer sample and on the correct answer sample separately based on an initial second semantic representation model to obtain a semantic representation vector of the incorrect answer sample and a semantic representation vector of the correct answer sample;
   determining a first vector similarity between the question sample and the incorrect answer sample based on the semantic representation vector of the question sample and the semantic representation vector of the incorrect answer sample;
   determining a second vector similarity between the question sample and the correct answer sample based on the semantic representation vector of the question sample and the semantic representation vector of the correct answer sample;
   adjusting model parameters of the initial first semantic representation model and model parameters of the initial second semantic representation model based on the first vector similarity and the second vector similarity until the first vector similarity and the second vector similarity meet a first preset condition; and
   determining a first semantic representation model obtained when the first preset condition is satisfied as the semantic representation model of answer, and determining a second semantic representation model obtained when the first preset condition is satisfied as the first semantic representation model of question.

2. The method of claim 1, wherein obtaining the semantic representation vector of answer corresponding to each candidate answer based on the semantic representation vector of the candidate answer and the semantic representation vector of title for the article title corresponding to the candidate answer comprises:
   multiplying the semantic representation vector of the candidate answer by a first weight to obtain a new semantic representation vector, the first weight being set in advance;
   multiplying the semantic representation vector of title by a second weight to obtain a new semantic representation vector of title, the second weight being set in advance; and
   splicing the new semantic representation vector and the new semantic representation vector of title to obtain a spliced semantic representation vector, and determining the spliced semantic representation as the semantic representation vector of answer corresponding to the candidate answer; and
   wherein performing the splicing operation based on the first semantic representation vector and the second semantic representation vector to obtain the target semantic representation vector for the question to be answered comprises:
   multiplying the first semantic representation vector by the first weight to obtain a first intermediate semantic representation vector for the question to be answered;
   multiplying the second semantic representation vector by the second weight to obtain a second intermediate semantic representation vector for the question to be answered; and splicing the first intermediate semantic representation vector and the second intermediate semantic representation vector to obtain the target semantic representation vector for the question to be answered.

3. The method of claim 1, wherein the answer sample comprises the incorrect answer sample and the correct answer sample, and the semantic representation model of title and the second semantic representation model of question are trained by:
performing the semantic representation vectorization on an article title corresponding to the incorrect answer sample and an article title corresponding to the correct answer sample based on an initial third semantic representation model to obtain a first semantic representation vector of title for the article title corresponding to the incorrect answer sample and a second semantic representation vector of title for the article title corresponding to the correct answer sample;
performing the semantic representation vectorization on the question sample based on an initial fourth semantic representation model to obtain the semantic representation vector of the question sample;
determining a third vector similarity between the question sample and the article title corresponding to the incorrect answer sample based on the semantic representation vector of the question sample and first semantic representation vector of title;
determining a fourth vector similarity between the question sample and of the article title corresponding to the correct answer sample based on the semantic representation vector of the question sample and second semantic representation vector of title;
adjusting model parameters of the initial third semantic representation model and model parameters of the initial fourth semantic representation model based on the third vector similarity and the fourth vector similarity until the third vector similarity and the fourth vector similarity meet a second preset condition; and
determining a third semantic representation model obtained when the second preset condition is satisfied as the semantic representation model of title, and determining a fourth semantic representation model obtained when the second preset condition is satisfied as the second semantic representation model of question.

4. The method of claim 3, wherein the first semantic representation model, the second semantic representation model, the third semantic representation model and the fourth semantic representation model are pre-trained semantic representation models, and the pre-trained semantic representation models are trained based on unsupervised data.

5. An electronic device, comprising:
at least one processor; and
a storage device communicatively connected to the at least one processor; wherein,
the storage device is configured to store an instruction executable by the at least one processor, and the instruction is executed by the at least one processor to enable the at least one processor to:
acquire a question to be answered;
input the question to be answered into a first semantic representation model of question and a second semantic representation model of question separately to obtain a first semantic representation vector and a second semantic representation vector for the question to be answered, wherein the first semantic representation model of question is trained based on a question sample and an answer sample corresponding to the question sample, and the second semantic representation model of question is trained based on the question sample and an article title corresponding to the answer sample;
perform a splicing operation based on the first semantic representation vector and the second semantic representation vector to obtain a target semantic representation vector for the question to be answered;
match the target semantic representation vector for the question to be answered with each semantic representation vector of answer contained in a pre-established vector index library of answer, wherein the vector index library of answer is established by converting all candidate answers in a sample pool of answer into respective semantic representation vectors, and the semantic representation vector of answer corresponding to each candidate answer is obtained based on the semantic representation vector of the candidate answer and a semantic representation vector of title for the article title corresponding to the candidate answer; and
acquire a target answer based on the semantic representation vector of answer matched with the target semantic representation vector, and outputting the target answer;
wherein the semantic representation vector of the candidate answer is obtained by performing a semantic representation vectorization on the candidate answer through a semantic representation model of answer, the semantic representation vector of title is obtained by performing the semantic representation vectorization on the article title corresponding to the candidate answer through a semantic representation model of title, the answer sample comprises an incorrect answer sample and a correct answer sample,
wherein the first semantic representation model of question and the semantic representation model of answer are trained by:
performing the semantic representation vectorization on the question sample based on an initial first semantic representation model to obtain a semantic representation vector of the question sample;
performing the semantic representation vectorization on the incorrect answer sample and on the correct answer sample separately based on an initial second semantic representation model to obtain a semantic representation vector of the incorrect answer sample and a semantic representation vector of the correct answer sample;
determining a first vector similarity between the question sample and the incorrect answer sample based on the semantic representation vector of the question sample and the semantic representation vector of the incorrect answer sample;
determining a second vector similarity between the question sample and the correct answer sample based on the semantic representation vector of the question sample and the semantic representation vector of the correct answer sample;
adjusting model parameters of the initial first semantic representation model and model parameters of the initial second semantic representation model based on the first vector similarity and the second vector similarity until the first vector similarity and the second vector similarity meet a first preset condition; and
determining a first semantic representation model obtained when the first preset condition is satisfied as the semantic representation model of answer, and determining a second semantic representation model obtained when the first preset condition is satisfied as the first semantic representation model of question.

6. The electronic device of claim 5, wherein the at least one processor is further configured to obtain the semantic representation vector of answer corresponding to each candidate answer based on the semantic representation vector of the candidate answer and the semantic representation vector of title for the article title corresponding to the candidate answer by:
  multiplying the semantic representation vector of the candidate answer by a first weight to obtain a new semantic representation vector, the first weight being set in advance;
  multiplying the semantic representation vector of title by a second weight to obtain a new semantic representation vector of title, the second weight being set in advance; and
  splicing the new semantic representation vector and the new semantic representation vector of title to obtain a spliced semantic representation vector, and determining the spliced semantic representation as the semantic representation vector of answer corresponding to the candidate answer; and
  wherein the at least one processor is configured to perform the splicing operation based on the first semantic representation vector and the second semantic representation vector to obtain the target semantic representation vector for the question to be answered by:
  multiplying the first semantic representation vector by the first weight to obtain a first intermediate semantic representation vector for the question to be answered;
  multiplying the second semantic representation vector by the second weight to obtain a second intermediate semantic representation vector for the question to be answered; and
  splicing the first intermediate semantic representation vector and the second intermediate semantic representation vector to obtain the target semantic representation vector for the question to be answered.

7. The electronic device of claim 5, wherein the answer sample comprises the incorrect answer sample and the correct answer sample, and the semantic representation model of title and the second semantic representation model of question are trained by:
  performing the semantic representation vectorization on an article title corresponding to the incorrect answer sample and an article title corresponding to the correct answer sample based on an initial third semantic representation model to obtain a first semantic representation vector of title for the article title corresponding to the incorrect answer sample and a second semantic representation vector of title for the article title corresponding to the correct answer sample;
  performing the semantic representation vectorization on the question sample based on an initial fourth semantic representation model to obtain the semantic representation vector of the question sample;
  determining a third vector similarity between the question sample and the article title corresponding to the incorrect answer sample based on the semantic representation vector of the question sample and first semantic representation vector of title;
  determining a fourth vector similarity between the question sample and of the article title corresponding to the correct answer sample based on the semantic representation vector of the question sample and second semantic representation vector of title;
  adjusting model parameters of the initial third semantic representation model and model parameters of the initial fourth semantic representation model based on the third vector similarity and the fourth vector similarity until the third vector similarity and the fourth vector similarity meet a second preset condition; and
  determining a third semantic representation model obtained when the second preset condition is satisfied as the semantic representation model of title, and determining a fourth semantic representation model obtained when the second preset condition is satisfied as the second semantic representation model of question.

8. The electronic device of claim 7, wherein the first semantic representation model, the second semantic representation model, the third semantic representation model and the fourth semantic representation model are pre-trained semantic representation models, and the pre-trained semantic representation models are trained based on unsupervised data.

9. A non-transitory computer-readable storage medium, having a computer instruction stored thereon, wherein the computer instruction is configured to cause a computer to perform the a method for processing questions and answers, the method comprising:
  acquiring a question to be answered;
  inputting the question to be answered into a first semantic representation model of question and a second semantic representation model of question separately to obtain a first semantic representation vector and a second semantic representation vector for the question to be answered, wherein the first semantic representation model of question is trained based on a question sample and an answer sample corresponding to the question sample, and the second semantic representation model of question is trained based on the question sample and an article title corresponding to the answer sample;
  performing a splicing operation based on the first semantic representation vector and the second semantic representation vector to obtain a target semantic representation vector for the question to be answered;
  matching the target semantic representation vector for the question to be answered with each semantic representation vector of answer contained in a pre-established vector index library of answer, wherein the vector index library of answer is established by converting all candidate answers in a sample pool of answer into respective semantic representation vectors, and the semantic representation vector of answer corresponding to each candidate answer is obtained based on the semantic representation vector of the candidate answer and a semantic representation vector of title for the article title corresponding to the candidate answer; and
  acquiring a target answer based on the semantic representation vector of answer matched with the target semantic representation vector, and outputting the target answer;
  wherein the semantic representation vector of the candidate answer is obtained by performing a semantic representation vectorization on the candidate answer through a semantic representation model of answer, the semantic representation vector of title is obtained by performing the semantic representation vectorization on the article title corresponding to the candidate answer through a semantic representation model of title, the answer sample comprises an incorrect answer sample and a correct answer sample, wherein the first semantic representation model of question and the semantic representation model of answer are trained by:
  performing the semantic representation vectorization on the question sample based on an initial first semantic representation model to obtain a semantic representation vector of the question sample;
  performing the semantic representation vectorization on the incorrect answer sample and on the correct answer sample separately based on an initial second semantic representation model to obtain a semantic representation vector of the incorrect answer sample and a semantic representation vector of the correct answer sample;
  determining a first vector similarity between the question sample and the incorrect answer sample based on the semantic representation vector of the question sample and the semantic representation vector of the incorrect answer sample;
  determining a second vector similarity between the question sample and the correct answer sample based on the semantic representation vector of the question sample and the semantic representation vector of the correct answer sample;
  adjusting model parameters of the initial first semantic representation model and model parameters of the initial second semantic representation model based on the first vector similarity and the second vector similarity until the first vector similarity and the second vector similarity meet a first preset condition; and
  determining a first semantic representation model obtained when the first preset condition is satisfied as the semantic representation model of answer, and determining a second semantic representation model obtained when the first preset condition is satisfied as the first semantic representation model of question.

10. The non-transitory computer-readable storage medium of claim 9, wherein obtaining the semantic representation vector of answer corresponding to each candidate answer based on the semantic representation vector of the candidate answer and the semantic representation vector of title for the article title corresponding to the candidate answer comprises:
  multiplying the semantic representation vector of the candidate answer by a first weight to obtain a new semantic representation vector, the first weight being set in advance;
  multiplying the semantic representation vector of title by a second weight to obtain a new semantic representation vector of title, the second weight being set in advance; and
  splicing the new semantic representation vector and the new semantic representation vector of title to obtain a spliced semantic representation vector, and determining the spliced semantic representation as the semantic representation vector of answer corresponding to the candidate answer; and
  wherein performing the splicing operation based on the first semantic representation vector and the second semantic representation vector to obtain the target semantic representation vector for the question to be answered comprises:
  multiplying the first semantic representation vector by the first weight to obtain a first intermediate semantic representation vector for the question to be answered;
  multiplying the second semantic representation vector by the second weight to obtain a second intermediate semantic representation vector for the question to be answered; and
  splicing the first intermediate semantic representation vector and the second intermediate semantic representation vector to obtain the target semantic representation vector for the question to be answered.

11. The non-transitory computer-readable storage medium of claim 9, wherein the answer sample comprises the incorrect answer sample and the correct answer sample, and the semantic representation model of title and the second semantic representation model of question are trained by:
  performing the semantic representation vectorization on an article title corresponding to the incorrect answer sample and an article title corresponding to the correct answer sample based on an initial third semantic representation model to obtain a first semantic representation vector of title for the article title corresponding to the incorrect answer sample and a second semantic representation vector of title for the article title corresponding to the correct answer sample;
  performing the semantic representation vectorization on the question sample based on an initial fourth semantic representation model to obtain the semantic representation vector of the question sample;
  determining a third vector similarity between the question sample and the article title corresponding to the incorrect answer sample based on the semantic representation vector of the question sample and first semantic representation vector of title;
  determining a fourth vector similarity between the question sample and of the article title corresponding to the correct answer sample based on the semantic representation vector of the question sample and second semantic representation vector of title;
  adjusting model parameters of the initial third semantic representation model and model parameters of the initial fourth semantic representation model based on the third vector similarity and the fourth vector similarity until the third vector similarity and the fourth vector similarity meet a second preset condition; and
  determining a third semantic representation model obtained when the second preset condition is satisfied as the semantic representation model of title, and determining a fourth semantic representation model obtained when the second preset condition is satisfied as the second semantic representation model of question.

12. The non-transitory computer-readable storage medium of claim 11, wherein the first semantic representation model, the second semantic representation model, the third semantic representation model and the fourth semantic representation model are pre-trained semantic representation models, and the pre-trained semantic representation models are trained based on unsupervised data.

* * * * *